United States Patent
Konttori et al.

(10) Patent No.: US 12,196,960 B1
(45) Date of Patent: Jan. 14, 2025

(54) LOCAL DIMMING AND COMPENSATION IN LIGHT FIELD DISPLAY

(71) Applicant: Distance Technologies Oy, Helsinki (FI)

(72) Inventors: Urho Konttori, Helsinki (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/630,202

(22) Filed: Apr. 9, 2024

(51) Int. Cl.
*G02B 27/01* (2006.01)
*G02B 30/10* (2020.01)
*G06F 3/01* (2006.01)

(52) U.S. Cl.
CPC ..... *G02B 27/0101* (2013.01); *G02B 27/0172* (2013.01); *G06F 3/013* (2013.01); *G02B 30/10* (2020.01)

(58) Field of Classification Search
CPC ........................ G02B 27/0101; G02B 27/0172; G02B 30/10; G06F 3/013
USPC ................................................. 345/156, 7, 84
See application file for complete search history.

(56) References Cited

U.S. PATENT DOCUMENTS

| | | | |
|---|---|---|---|
| 2021/0266474 A1* | 8/2021 | Sharma | G02B 27/0093 |
| 2023/0194873 A1* | 6/2023 | Jamali | G02B 27/0172 |
| | | | 349/11 |

* cited by examiner

*Primary Examiner* — Jimmy H Nguyen
(74) *Attorney, Agent, or Firm* — Ziegler IP Law Group LLC.

(57) ABSTRACT

An optical combiner is employed to reflect a first part and a second part of a synthetic light field towards a first eye and a second eye of user(s), respectively, whilst optically combining the first part and the second part with a real-world light field. Portion(s) of the optical combiner from which a part of the synthetic light field is reflecting towards a given eye of a given user is determined, based on a relative location of the given eye with respect to the optical combiner. Portion(s) of active optical device(s) that corresponds to the portion(s) of the optical combiner are activated, to decrease transmittance of the real-world light field passing through the portion(s) of the optical combiner towards the given eye, and/or to increase reflectance of the synthetic light field being reflected by the portion(s) of the optical combiner towards the given eye.

20 Claims, 5 Drawing Sheets

LOCAL DIMMING AND COMPENSATION IN LIGHT FIELD DISPLAY

TECHNICAL FIELD

The present disclosure relates to systems incorporating local dimming and compensation in light field display. The present disclosure also relates to methods incorporating local dimming and compensation in light field display.

BACKGROUND

Glasses-free augmented-reality (AR) systems (for example, such as automotive head-up displays (HUDs) or similar) typically comprise a light field display unit and an optical combiner that optically combines a synthetic light field produced by the light field display unit with a real-world light field.

However, conventional AR systems have certain drawbacks. Firstly, a brightness of the real-world light field may be very high, for example, in case of direct sunlight. In such a case, a conventional AR system is not capable of producing a high enough brightness to display readable (namely, high-contrast) virtual content. Thus, creating high-contrast virtual content against bright backgrounds is difficult. In this regard, there also exist rules and regulations concerning a minimal required contrast for automotive HUDs when displaying some important instrumentation (for example, such as a speed gauge or warning lights).

Secondly, the brightness of the real-world light field arising, for example, due to glare from the Sun, reflections from puddles, reflections from water, or the like is by itself also a disturbing factor for users.

Thirdly, as the synthetic light field is optically combined with the real-world light field, the conventional AR system can only add more light to the real-world light field that is already bright. Therefore, it is not possible to display any virtual content that is completely black, and all AR content eventually appears halo-like and ethereal.

Therefore, in light of the foregoing discussion, there exists a need to overcome the aforementioned drawbacks.

SUMMARY

The present disclosure seeks to provide a system and a method for presenting high-contrast virtual content via a synthetic light field augmenting a real-world light field for one or more users, in a computationally-efficient manner. The aim of the present disclosure is achieved by a system and a method which incorporate local dimming and compensation in light field displays based on a relative location of a given eye of a given user, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A illustrates an example scenario of how a light emitting-component of a light field display unit produces a synthetic light field for different viewers, while

DETAILED DESCRIPTION OF EMBODIMENTS

Figure 1:
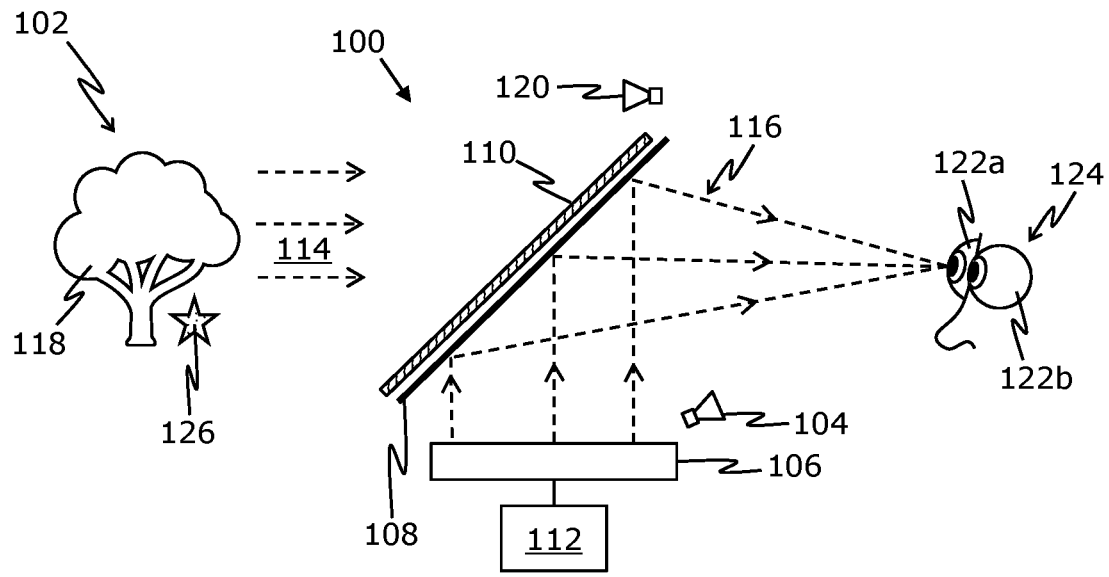
FIG. 1 illustrates an example implementation of a system incorporating local dimming and compensation during synthetic light field display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a light field display unit;
  an optical combiner arranged on an optical path of the light field display unit and on an optical path of a real-world light field of a real-world environment;
  at least one active optical device, arranged on the optical path of the real-world light field, employed to selectively control at least one of: (i) transmittance of at least a part of the real-world light field passing through at least a portion of the optical combiner, (ii) reflectance of at least a part of a synthetic light field produced by the light field display unit and reflected from at least a portion of the optical combiner; and
  at least one processor configured to:
    utilise the tracking means to determine a relative location of a first eye and of a second eye of at least one user with respect to the optical combiner;
    produce the synthetic light field presenting virtual content using the light field display unit, wherein the optical combiner is employed to reflect a first part and a second part of the synthetic light field towards the first eye and the second eye of the at least one user, respectively, whilst optically combining the first part and the second part of the synthetic light field with the real-world light field;

determine at least one portion of the optical combiner from which a part of the synthetic light field is reflecting towards a given eye of the at least one user, based on the relative location of the given eye with respect to the optical combiner; and activate at least one portion of the at least one active optical device that corresponds to the at least one portion of the optical combiner, to perform at least one of:
  (i) decrease the transmittance of a part of the real-world light field passing through the at least one portion of the optical combiner towards the given eye,
  (ii) increase the reflectance of the part of the synthetic light field being reflected by the at least one portion of the optical combiner towards the given eye.

In a second aspect, an embodiment of the present disclosure provides a method comprising:

utilising tracking means to determine a relative location of a first eye and of a second eye of at least one user with respect to an optical combiner, the optical combiner being arranged on an optical path of a light field display unit and on an optical path of a real-world light field of a real-world environment;

producing a synthetic light field presenting virtual content using the light field display unit, wherein the optical combiner is employed to reflect a first part and a second part of the synthetic light field towards the first eye and the second eye of the at least one user, respectively, whilst optically combining the first part and the second part of the synthetic light field with the real-world light field;

determining at least one portion of the optical combiner from which a part of the synthetic light field is reflecting towards a given eye of the at least one user, based on the relative location of the given eye with respect to the optical combiner; and activating at least one portion of at least one active optical device, arranged on the optical path of the real-world light field, that corresponds to the at least one portion of the optical combiner, to perform at least one of:
  (i) decreasing a transmittance of a part of the real-world light field passing through the at least one portion of the optical combiner towards the given eye,
  (ii) increasing a reflectance of the part of the synthetic light field being reflected by the at least one portion of the optical combiner towards the given eye.

The present disclosure provides the aforementioned system and the aforementioned method incorporating local dimming and compensation during synthetic light field display based on relative locations of eyes of the at least one user in a computationally-efficient manner. This allows the at least one user to see clearly the virtual content being presented (by the synthetic light field), due to an improved contrast, thereby enhancing an overall visual experience of the at least one user. This may be particularly beneficial when visual information that is critical for the user is being presented, because by incorporating the local dimming, visibility of such critical visual information is not obscured by brightness of the real-world light field in the real-world environment. It will be appreciated that the aforesaid local dimming and compensation need not be performed for an entirety of the synthetic light field, and can be performed for certain parts of the synthetic light field on a need basis. Thus, the aforesaid system and method enable to produce a realistic and high-quality synthetic light field that augments the real-world light field viewed by the at least one user, whilst incorporating the local dimming and compensation. In this regard, the first part and the second part of the synthetic light field present respective virtual images (augmenting respective real-world images) to the first eye and the second eye of the at least one user. This beneficially enables the user to perceive depth in the virtual content being presented through these virtual images. Moreover, the system and the method are robust, fast, reliable, support real-time simultaneous presentation of virtual images (via respective parts of the synthetic light field) to eyes of one or more users.

Throughout the present disclosure, the term "tracking means" refers to a specialised equipment for detecting and/or following a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the user's eyes. A relative location of the at least one tracking camera with respect to the optical combiner is fixed, and is pre-known. This enables to determine the relative location of the first eye and of the second eye of the at least one user with respect to the optical combiner. Optionally, in this regard, when the tracking means are utilised to detect and/or follow the location of the first eye and of the second eye, a location of the first eye and of the second eye with respect to the at least one tracking camera is accurately known. Thus, the relative location of the first eye and of the second eye with respect to the optical combiner can be determined, based on the relative location of the at least one tracking camera with respect to the optical combiner and the location of the first eye and of the second eye with respect to the at least one tracking camera.

Optionally, the relative location of the first eye and of the second eye is represented in a given coordinate space. As an example, the given coordinate space may be a Cartesian coordinate space. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the tracking means is employed to repeatedly track the location of at least the eyes of the given user throughout a given session of using the system. This allows for repeatedly determining the relative location of the first eye and of the second eye with respect to the optical combiner in real time or near-real time. Beneficially, this allows for presenting the at least one user with an augmented view of the synthetic light field with the real-world light field in an autostereoscopic manner. It is to be understood that when the synthetic light field is being produced for a plurality of users simultaneously, relative locations of both eyes of each user from amongst the plurality of users are determined in a same manner as discussed hereinabove. Moreover, the relative location of the first eye and of the second eye is determined with respect to the optical combiner, because the synthetic light field (that is being produced by the light field display unit) would be presented to the at least one user via the optical combiner only.

The at least one processor controls an overall operation of the system. The at least one processor is communicably coupled to at least the tracking means, the light field display unit and the at least one active optical device. Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "light field display unit" refers to a specialised equipment that is capable of producing the synthetic light field. In other words, the light field display unit is utilised to employ an input (which may be generated by the at least one processor) to produce the synthetic light field at a given resolution. Pursuant to embodiments of the present disclosure, different types of light field display units can be implemented. For example, the light field display unit can be any one of: a hogel-based light field display unit, a lenticular array based light field display unit, a parallax-barrier based light field display unit, a hologram-projector based light field display unit, a scanning-laser based light field display unit, a CRT-like light field display unit. Accordingly, the input employed by the light field display unit can be in various different forms, depending on a type of the light field display unit that is implemented. As a first example, in case of a hogel-based light field display unit or a lenticular array based light field display unit or a parallax-barrier based light field display unit, the input can be in a form of a light field image comprising pixels. As a second example, in case of a hologram-projector based light field display unit, the input can be in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input can be in a form of a video signal comprising analog electrical signals. Depending on the type of the light field display unit, a light-emitting component of the light field display unit may be implemented in various different forms, for example, such as a backlight, light-emitting diodes (LEDs), organic LEDs (OLEDs), micro LEDs, a laser, a spatial light modulator, among others. All the aforementioned forms of light field display units and their corresponding inputs are well known in the art.

Optionally, the at least one processor is configured to generate the input to be employed by the light field display unit for producing the synthetic light field, based on the relative location of the first eye and of the second eye of the at least one user with respect to the optical combiner. Such a manner of generating the input is unlike the prior art where an input is generated for several different locations, irrespective of whether or not any user is present at those locations. Thus, for a given native resolution of the light field display unit, an effective resolution of the respective virtual images presented to the first eye and the second eye of the at least one user is considerably higher, as compared to the prior art where an effective resolution of a virtual image presented per eye is drastically reduced. It will be appreciated that in a case where the at least one user comprises a plurality of users, the same input is employed by the light field display unit for producing the synthetic light field presenting the virtual content to the plurality of users simultaneously. In such a case, a resolution of the first part and the second part of the synthetic light field being displayed to a particular user depends on a total number of users for which the input has been generated. For example, when the synthetic light field is to be produced for a single user, the first part of the synthetic light field may be generated by 50 percent of the input, and the second part of the synthetic light field may be generated by a remaining 50 percent of the input. In such a case, an effective resolution per eye would be a half of a native display resolution of the light field display unit. However, when the synthetic light field is to be produced for two users, for each of the two users, the first part of the synthetic light field may be generated by 25 percent of the input, and the second part of the synthetic light field may be generated by 25 percent of the input. In such a case, an effective resolution per eye would be one-fourth of the native display resolution of the light field display unit. In other words, greater the number of users, lower is the resolution of the first part and the second part of the synthetic light field being displayed to a single user, and vice versa. Moreover, in implementations where the input is in a form of a light field image, because the input is generated based on the relative locations of the user's eyes only, an extremely large number of pixels is not required to present the virtual images at a given resolution (for example, such as 60 pixels per degree). This may potentially reduce a size of the input to be employed.

Moreover, the system and the method are susceptible to produce a large field of view in comparison to the prior art, as the light field display unit can be implemented as a flat component that can be installed easily even when there is a space constraint. The system and the method can be easily employed in various different spaces, for example, such as inside vehicles, rooms with windows, and the like.

Upon reflection of the first part and the second part of the synthetic light field from the optical combiner, visual information corresponding to a first part of the input and a second part of the input is perceived by the first eye and the second eye, respectively, as a first virtual image and a second virtual image. In case of a light field image, the input may be understood to be a two-dimensional (2D) image comprising a plurality of pixels, wherein the first part of the input comprises a first set of pixels from amongst the plurality of pixels that is responsible for generating the first part of the synthetic light field that corresponds to the first eye, and the second part of the input comprises a second set of pixels from amongst the plurality of pixels that is responsible for generating the second part of the synthetic light field that corresponds to the second eye. It will be appreciated that the pixels belonging to the first set are not arranged in a continuous manner across the light field image (namely, the input); similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the (single) light field image would comprise visual information corresponding to the first eye as well as the second eye of the at least one user. As an example, a cylindrical-lens lenticular array (in a lenticular array based light field display unit) may direct light produced by pixels lying on a given vertical stripe towards the first eye, while directing light produced by pixels lying on a neighbouring vertical stripe towards the second eye. This minimal implementation would sacrifice a half of a horizontal resolution to achieve per-eye rendering capability for two eyes of the at least one user. If there are at least 1000 vertical stripes of pixels each for the left eye and the right eye, there would be at least 1000 columns of microlenses in the lenticular array.

Furthermore, optionally, the at least one processor is configured to utilise the tracking means to also determine a relative location of a camera lens of a camera with respect to the optical combiner,
  wherein the input is generated further based on the relative location of the camera lens with respect to the optical combiner, and
  wherein the optical combiner is employed to reflect a third part of the synthetic light field towards the camera lens of the camera, whilst optically combining the third part of the synthetic light field with the real-world light field.

In this regard, the tracking means is employed to also detect and/or follow a location of the camera lens of the camera. This allows for accurately determining the relative location of the camera lens with respect to the optical combiner, using the relative location of the at least one tracking camera with respect to the optical combiner and the location of the camera lens with respect to the at least one tracking camera. It will be appreciated that said camera could be a camera of a user device, or could be a camera arranged in the space in which the at least one user is present. The user device could, for example, be a smartphone, a laptop, a tablet, a phablet, or the like.

It will be appreciated that when the optical combiner reflects the third part of the synthetic light field towards the camera lens, it means that light produced by a third part of the input, generating the third part of the synthetic light field, is directed towards the camera lens upon reflecting off the optical combiner. Additionally, when the third part of the synthetic light field is optically combined with the real-world light field, the camera lens would receive light field constituting visual information corresponding to the third part of the input, along with receiving light field constituting the visual information pertaining to the real-world objects from the perspective of the location of the camera lens. In this regard, when the aforesaid light field would be detected at a photosensitive surface of an image sensor of the camera, a combined view of the third part of the synthetic light field augmenting the real-world light field would be captured.

In some implementations, the virtual content presented by the synthetic light field corresponds to at least one virtual object. Optionally, in this regard, the at least one processor is configured to generate the input from a perspective of the relative location of the first eye and of the second eye of the at least one user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the 3D model is generated in the given coordinate space. Optionally, the at least one processor is configured to store the 3D model at a data repository that is communicably coupled to the at least one processor. The data repository may be implemented as a memory of the at least one processor, a cloud-based database, or similar.

Furthermore, optionally, when the input is in a form of the light field image, the first part of the input and the second part of the input comprise the first set of pixels and the second set of pixels corresponding to the first eye and the second eye of the at least one user, respectively, wherein when generating the input, the at least one processor is configured to determine, within the light field image, a position of a given pixel of the first set and a position of a given pixel of the second set that correspond to a given synthetic three-dimensional (3D) point, based on an interpupillary distance between the first eye and the second eye of the at least one user and an optical depth at which the given synthetic 3D point is to be displayed. The technical benefit of determining said positions is that the given synthetic 3D point can be presented accurately and realistically, by utilising binocular disparity, based on the interpupillary distance and the optical depth at which the given synthetic 3D point is to be displayed.

It will be appreciated that when the at least one virtual object is to be presented at an optical depth that is similar to a native optical depth of a light-emitting component of the light field display unit from the at least one user, there is no need for displaying different virtual images to the first eye and the second eye; in other words, a same virtual image would be shown to both the eyes. Herein, the native optical depth of the light-emitting component is equal to a sum of a distance between a given eye of the given user and the optical combiner and a distance between the optical combiner and the light-emitting component. By "similar" hereinabove, it is meant that said optical depth is within, for example, 10 centimetre of the native optical depth. In a typical implementation inside a vehicle, the native optical depth may lie in a range of 100 cm to 300 cm.

When the at least one virtual object is to be presented to appear far away from the first eye and the second eye (for example, 100 metres away), this means that the given synthetic 3D point is to be displayed at an optical depth with respect to the first eye and the second eye that is much larger than the native optical depth of the light-emitting component, and thus, the distance between the given pixel of the first set and the given pixel of the second set may be similar to the interpupillary distance. By "similar" hereinabove, it is meant that said distance is within, for example, 1 centimetre of the interpupillary distance.

Similarly, when the at least one virtual object is to be presented to appear near the first eye and the second eye (for example, at a distance of 10 centimetres), this means that the given synthetic 3D point is to be displayed at an optical depth with respect to the first eye and the second eye that is much smaller than the native optical depth of the light-emitting component. In such a case, a degree of cross-eyedness increases for the given user. This occurs because the eyes of the given user need to converge more sharply to focus on nearby objects. In such a case, the distance between the given pixel of the first set and the given pixel of the second set may be similar to the interpupillary distance, or may be even more than the interpupillary distance (only constrained by physical dimensions of the light-emitting surface of the light field display unit).

On the other hand, when the at least one virtual object is to be presented at an optical depth that is not similar to the native optical depth, and that lies between the native optical depth and an infinite distance or between the native optical depth and zero optical depth, the distance between the given pixel of the first set and the given pixel of the second set may be smaller than the interpupillary distance. In such a case, said distance may be determined based on a convergence angle of the user's eyes. The light emanating from the given pixel of the first set produces the given synthetic 3D point within the first part of the synthetic light field, and the light emanating from the given pixel of the second set produces the (same) given synthetic 3D point within the second part of the synthetic light field. However, it is to be understood that when the at least one virtual object is to be presented at an optical depth that is not similar to the native optical depth, a position of the (same) given synthetic 3D point would appear to be slightly offset, when the (same) given synthetic 3D point is viewed from a perspective of the first eye and from a perspective of the second eye, due to binocular disparity.

It will also be appreciated that when the optical depth at which the given synthetic 3D point is to be displayed is greater than the native optical depth of the light-emitting component of the light field display unit, a disparity between the given pixel of the first set and the given pixel of the second set would be positive. On the other hand, when the optical depth at which the given synthetic 3D point is to be displayed is smaller than the native optical depth, a disparity between a given pixel of the first set and a given pixel of the second set would be negative. Hereinabove, when the disparity is positive, the position of the given pixel of the first set would be on a side of the first eye, and the position of the given pixel of the second set would be on a side of the second eye. When the disparity is positive, said disparity may increase asymptotically to reach its maximum value, which is equal to the interpupillary distance. However, when the disparity is negative, the position of the given pixel of the first set would be on the side of the second eye, and the position of the given pixel of the second set would be on the side of the first eye, i.e., an order of the position of the given pixel of the first set and the position of the given pixel of the second set is swapped.

In implementations where the virtual content presented by the synthetic light field corresponds to the at least one virtual object, the at least one processor is configured to determine a colour of the given pixel of the first set and a colour of the given pixel of the second set, by employing the 3D model of the at least one virtual object. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

Optionally, the system further comprises at least one real-world-facing camera, wherein the at least one processor is configured to:
  process images captured by the at least one real-world-facing camera, to generate a depth image of the real-world environment; and
  determine the optical depth at which the given synthetic 3D point is to be displayed, based on the depth image.

The term "real-world-facing camera" refers to a camera that is arranged to face the real-world environment, and is employed to capture images of the real-world environment. The at least one real-world-facing camera could comprise at least one of: at least one visible-light camera, at least one depth camera. Thus, said images could be depth images and/or visible-light images of the real-world environment. As an example, the images may be captured as RGB-D images. In case of visible-light cameras, the depth image can be generated based on stereo disparity between images captured by a pair of visible-light cameras. Throughout the present disclosure, the term "depth image" refers to an image comprising information pertaining to optical depths of real-world objects or their portions present in the real-world environment. In other words, the depth image provides information pertaining to distances (namely, the optical depths) of surfaces of the real-world objects or their portions, from a perspective of a pose of the at least one real-world-facing camera. It is to be understood that depth images would also be indicative of placements, geometries, occlusions, and the like, of the real-world objects from various perspectives of poses of the at least one real-world-facing camera.

It will be appreciated that there may be a scenario where the at least one virtual object is to be presented in relation to some real-world object(s). In other words, an optical depth of the at least one virtual object may be determined based on an optical depth of a real-world object. For example, a virtual bird may be displayed with respect to a branch of a tree (i.e., a real-world object) such that an optical depth of the virtual bird is (almost) same as an optical depth of the branch of the tree. In such an example, the virtual bird would not appear to be hanging in front of the branch, neither would appear to be penetrated into the branch. Therefore, the at least one processor is optionally configured to utilise the depth image to identify real-world object(s) present within a real-world scene of the real-world environment in which the at least one virtual object is to be augmented. Such an identification could be performed, for example, by using at least one of: object identification, object segmentation, material identification. Techniques/algorithms for the object identification, the object segmentation, and the material identification are well-known in the art. Once the real-world object(s) are identified and their respective optical depths are known, the at least one processor is optionally configured to determine the optical depth of the given synthetic 3D point as an optical depth of a given real-world object (or its portion). Beneficially, in such a case, the first part and the second part of the synthetic light field would appear to be well-blended with the real-world light field, as the at least one virtual object would be accurately aligned/positioned with respect to the given real-world object. This significantly enhances an overall viewing experience of the at least one user (for example, in terms of realism and immersiveness), when the synthetic light field is produced to present the at least one virtual object to the at least one user. It will be appreciated that in other scenarios, the optical depth of the given synthetic 3D point may not always be same as the optical depth of the given real-world object. However, in such scenarios, the optical depth of the given real-world object can still be beneficial to be taken into account for determining the optical depth of the given synthetic 3D point, for improving an overall visual coherence and realism when producing the synthetic light field presenting the at least one virtual object.

Throughout the present disclosure, the term "real-world light field" refers to a light field emanating from the real-world environment in which the at least one user is present. Throughout the present disclosure, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the first eye and the second eye of the at least one user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the first eye and the second eye of the at least one user. In this way, visual information pertaining to the at least one virtual object (namely, the virtual content) can be perceived by the first eye and the second eye.

It will be appreciated that each light field region (namely, a region of the synthetic light field) within a virtual scene can be accurately mapped to a corresponding position in the real-world environment at any optical depth, due to a capability to generate separate virtual images at varying angles for each eye of the at least one user. This phenomenon creates a perceptual illusion for humans that a given light field region exists at a correct distance, owing to the differential vergence between the given light field region and a corresponding light field region for the first eye and the second eye, respectively. In a monoscopic viewing arrangement (for example, such as for a smartphone camera or similar), the synthetic light field is displayed with a single-view perspective that accurately corresponds to the real-world environment. While convergence has been effectively addressed, a disparity persists in a focus between a real-world scene of the real-world environment and the virtual scene. This discrepancy, known as vergence-accommodation conflict (VAC), remains a challenge. The accommodation delta, ranging from infinity (0 dioptres) to 1 meter, amounts to 1 dioptre. The accommodation delta diminishes when producing light field regions of a virtual object that is positioned closer than an infinite distance. At such a reduced delta, the synthetic light field presents a comfortable viewing experience for objects situated at both infinity and closer distances, for example, such as those within 2 metres of a vehicle when the system is implemented inside said vehicle.

Throughout the present disclosure, the term "optical combiner" refers to a specialised equipment that is capable of reflecting a corresponding part of the synthetic light field towards the given eye of the given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the at least one user comprises a plurality of users, some users from amongst the plurality of users may directly face the optical combiner (namely, in almost a straight manner), while remaining users may face the optical combiner in a diagonal manner (namely, obliquely or sideways). Optionally, a tilt angle of the optical combiner with respect to an image plane of the light field display unit lies in a range of 30 degrees and 60 degrees.

It will be appreciated that when the optical combiner reflects the first part and the second part of the synthetic light field towards the first eye and the second eye, respectively, it means that light produced by the first part of the input, generating the first part of the synthetic light field, is directed towards the first eye upon reflecting off the optical combiner. Simultaneously, light produced by the second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the at least one user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the at least one user.

Throughout the present disclosure, the term "active optical device" refers to an optical device that can be controlled actively. In particular, one or more particular portions of the active optical device can be selectively controlled pursuant to embodiments of the present disclosure. The at least one active optical device can be implemented as solid-state optics. As an example, the at least one active optical device can be implemented as a liquid-crystal-based optical device, or an electrochromic optical device.

The at least one active optical device is arranged on the optical path of the real-world light field. In some implementations, the at least one active optical device is employed to only control transmittance of the real-world light field. In other words, it does not affect the synthetic light field produced by the light field display unit. In such implementations, the at least one optical device can be in a form of any one of: (i) a layer on a real-world-facing side of the optical combiner, (ii) a separate device arranged between the optical combiner and the real-world environment. In other implementations, the at least one active optical device is employed to only control reflectance of the synthetic light field. In such implementations, the at least one active optical device can be in a form of a layer on a user-facing side of the optical combiner (namely, the reflective surface of the optical combiner). In yet other implementations, the at least one active optical device can be employed to control both the transmittance and the reflectance. In such implementations, the at least one active optical device could comprise a first active optical device and a second active optical device that are arranged on the real-world-facing side and the user-facing side of the optical combiner, respectively.

Pursuant to the present disclosure, the at least one portion of the optical combiner from which the part of the synthetic light field is reflecting towards the given eye of the at least one user is determined, based on the relative location of the given eye with respect to the optical combiner.

Accordingly, the at least one portion of the at least one active optical device that corresponds to the at least one portion of the optical combiner is activated, to (i) decrease the transmittance of the part of the real-world light field passing through the at least one portion of the optical combiner towards the given eye, and/or (ii) increase the reflectance of the part of the synthetic light field being reflected by the at least one portion of the optical combiner towards the given eye. Herein, by "corresponds", it is meant that the at least one portion of the at least one active optical device lies on the optical path of the at least one portion of the optical combiner. It will be appreciated that the aforementioned steps are performed per each viewpoint, namely, each eye of each user.

Said part of the synthetic light field could be any one of: the first part of the synthetic light field, the second part of the synthetic light field, a sub-part of the first part, or a sub-part of the second part, depending on whether the given eye is the first eye or the second eye. Beneficially, said part of the synthetic light field could correspond to visual information that is critical to the given user, and therefore, is desired to be presented with greater clarity. Optionally, in this regard, when the input employed by the light field display unit is generated by employing the 3D model of the at least one virtual object, the 3D model could be tagged with a flag indicating whether the virtual object pertains to visual information that is critical. This allows to determine which part of the synthetic light field should be selectively presented with greater clarity. Such criticality may be applicable for certain specific scenarios or may be applicable at all times. As an example, when the system is implemented in a vehicle, visual information pertaining to instrumentation (for example, such as a speed gauge and warning lights) may be considered critical.

Moreover, optionally, the system further comprises at least one real-world-facing camera that is employed to capture a two-dimensional (2D) real-world image of the real-world environment, wherein the at least one processor is configured to:

determine, based on the relative location of the given eye with respect to the optical combiner, at least one other portion of the optical combiner from which no synthetic light field is being reflected towards the given eye, but whose corresponding portion of the at least one active optical device is activated to decrease transmittance of a part of the real-world light field passing through the at least one other portion of the optical combiner towards the given eye;

determine a part of the input that is employed to produce a part of the synthetic light field that is being reflected by the at least one other portion of the optical combiner towards the given eye;

generate a synthetic 2D image by utilising the 2D real-world image, the synthetic 2D image representing real-world content corresponding to at least the at least one other portion of the optical combiner from a perspective of the given eye; and determine a decrease in the transmittance of said part of the real-world light field passing through the at least one other portion of the optical combiner towards the given eye due to activation of the corresponding portion of the at least one active optical device, wherein when generating the input to be employed by the light field display unit for producing the synthetic light field, the at least one processor is configured to utilise the synthetic 2D image depicting the real-world content, to generate intensity values for said part of the input, based on the decrease in the transmittance, and the relative location of the given eye with respect to the optical combiner.

This is particularly beneficial for a scenario where a local dimming of the part of the real-world light field (passing through the at least one other portion of the optical combiner towards the given eye) is performed for another eye of the same given user and/or for at least one eye of another user. Such a scenario is possible in case of multiple users, because selective local dimming is incorporated per eye for each user. Therefore, the aforementioned steps are performed per each viewpoint, namely, each eye of each user. Moreover, this is also beneficial for another scenario where certain portions of the at least one active optical device are activated statically. As an example, a portion of the at least one active optical device that lies on an optical path of a bottom of a windshield (in case of a vehicle) may be activated statically; in other words, the at least one active optical device may be activated statically to decrease the transmittance of the part of the real-world light field, and/or to increase the reflectance of a corresponding part of the synthetic light field. In such a case, it may be beneficial to produce a synthetic version of the real-world content at those portions if those portions are not currently being used for presenting the virtual content.

In this regard, the at least one other portion of the optical combiner (from which no synthetic light field is being reflected towards the given eye, but whose corresponding portion of the at least one active optical device is activated to decrease transmittance of said part of the real-world light field passing through the at least one other portion of the optical combiner towards the given eye) corresponds to a part of the field of view of the given user for which no synthetic light field is generated from a perspective of the given eye for a current frame. In such a case, no virtual content is being presented to the given eye via the at least one other portion of the optical combiner. It will be appreciated here that by "activated to decrease the transmittance of said part of the real-world light field", it may also be meant that the corresponding portion of the at least one active optical device is activated to increase the reflectance of any synthetic light field incident thereupon.

Accordingly, the synthetic 2D image is generated by utilising the 2D real-world image, wherein the synthetic 2D image represents real-world content corresponding to at least the at least one other portion of the optical combiner from a perspective of the given eye. By "at least" the at least one other portion of the optical combiner, it is meant that the same synthetic 2D image may also represent real-world content corresponding to additional portions of the optical combiner from a perspective of the another eye of the same given user and/or for eyes of other user(s). It will be appreciated that in an implementation where the input is in a form of a light field image, this synthetic 2D image is different from the light field image.

The input to be employed by the light field display unit (for producing the synthetic light field) is then generated by utilising the synthetic 2D image depicting the real-world content. As an example, in case of a light field image, intensity values for said part of the input refer to intensity values of pixels in a corresponding set of pixels of the light field image. When generated in such a manner, the intensity values for said part of the input compensate for the decrease in the transmittance of the part of the real-world light field. When this input is employed by the light field display unit for producing the synthetic light field, the at least one user perceives the real-world content of said part of the real-world light field, even though the transmittance of said part of the real-world light field is actually being decreased by the at least one active optical element.

Optionally, the system further comprises gaze-tracking means, wherein the at least one processor is configured to:
  utilise the gaze-tracking means to determine gaze directions of the eyes of the at least one user;
  detect, based on the gaze directions of the eyes of the at least one user, when the at least one user is not gazing through the at least one other portion of the optical combiner; and
  when it is detected that the at least one user is not gazing through the at least one other portion of the optical combiner, perform any one of:
    skip generating the synthetic 2D image depicting the real-world content corresponding to at least the at least one other portion of the optical combiner from the perspective of the given eye, or
    generate the synthetic 2D image at a second resolution that is lower than a first resolution, wherein a given synthetic 2D image is generated at the first resolution when it is detected that the at least one user is gazing through the at least one other portion of the optical combiner.

Optionally, the tracking means is implemented as the gaze-tracking means. In such a case, the at least one processor is configured to utilise the tracking data collected by the tracking means, for determining the gaze directions of the eyes of the at least one user. This allows for detecting when the at least one user is not gazing through the at least one other portion of the optical combiner. The tracking data may also be utilised to detect when the eyes of the at least one of the plurality of users are closed. Optionally, in this regard, when the tracking data comprises a plurality of images of a given eye of a given user from amongst the plurality of users, the at least one processor is configured to: extract a plurality of features of the given eye from a given image; identify at least one of: a pupil of the given eye, a position of the pupil with respect to corners of the given eye, a curvature of an eyelid of the given eye, a position of an eyelash of the given eye, a shape of the given eye, a size of the given eye, based on the plurality of features, to determine the gaze directions and optionally, to detect when the given eye of the given user is closed. Gaze tracking is well-known in the art.

When it is detected that the at least one user is not gazing through the at least one other portion of the optical combiner, it means that any virtual content presented by the part of the synthetic light field (reflecting through the at least one other portion of the optical combiner towards the given eye) is not a part of a region of interest within the field of view of the at least one user. Therefore, either the generation of the synthetic 2D image may be skipped completely, or the synthetic 2D image may be generated at a lower resolution (namely, the second resolution). Advantageously, skipping generation of the synthetic 2D image or generating the synthetic 2D image at the lower resolution facilitates in saving processing resources and processing time of the at least one processor. In a case where the generation of the synthetic 2D image is skipped, the intensity values of said part of the input are not generated at all (because no synthetic light field was being reflected from the at least one other portion of the optical combiner towards the given eye at the first place). In case of a light field image, this allows for turning off said pixels of the input. This, in turn, minimises a potential light leakage from said pixels, as by keeping inactive pixels black, they act as a barrier to prevent leaking/straying of the light into neighbouring parts of the synthetic light field.

Furthermore, optionally, the at least one processor is configured to:
  determine an intensity of the part of the real-world light field passing through the at least one portion of the optical combiner from which the corresponding part of the synthetic light field is reflecting towards the given eye;
  detect when the intensity of the part of the real-world light field passing through the at least one portion of the optical combiner is lower than an intended intensity of the corresponding part of the synthetic light field that is reflecting from the at least one portion of the optical combiner towards the given eye; and
  when it is detected that the intensity of said part of the real-world light field is lower than the intended intensity of the corresponding part of the synthetic light field,
    skip activating the at least one portion of the at least one active optical device that corresponds to the at least one portion of the optical combiner; and
    adjust intensity values of a given part of the input that is employed for producing the corresponding part of the synthetic light field, based on a difference between the intended intensity of the corresponding part of the synthetic light field and the intensity of said part of the real-world light field.

When the intensity of the part of the real-world light field (passing through the at least one portion of the optical combiner) is lower than an intended intensity of the corresponding part of the synthetic light field (that is reflecting from the at least one portion of the optical combiner towards the given eye), the intensity of the part of the real-world light field can be leveraged to produce the intended intensity, and the intensity values of the given part of the input can be adjusted to only produce the difference between the intended intensity and the intensity of said part of the real-world light field. Advantageously, this facilitates in reducing power consumption of the light field display unit. Herein, the term "intended intensity" refers to an intensity of the synthetic light field that was originally intended to be presented to the at least one user. The intended intensity can be determined from intensity values of a corresponding part of the input, which may be generated from the 3D model of the at least one virtual object.

The intensity of the part of the real-world light field (passing through the at least one portion of the optical combiner from which the corresponding part of the synthetic light field is reflecting towards the given eye) can be determined by:
- utilising at least one real-world-facing camera of the system that is employed to capture at least one 2D real-world image of the real-world environment,
- reprojecting the at least one 2D real-world image from a perspective of the at least one real-world-facing camera to a perspective of the viewpoint of the given eye (for example, using depth data from a separate depth camera, or from a stereo disparity analysis of a pair of visible-light images of the real-world environment captured by a pair of visible-light cameras implemented as the at least one real-world-facing camera, or similar), and
- mapping a viewing direction of the at least one portion of the optical combiner from the given eye with viewing directions of pixels in a reprojected version of the at least one 2D real-world image from the given eye.

It will be appreciated that when it is detected that the intensity of said part of the real-world light field is not lower than the intended intensity of the corresponding part of the synthetic light field, the at least one portion of the at least one active optical device is activated to decrease the transmittance and/or to increase the reflectance, as mentioned earlier.

Moreover, optionally, the system further comprises the gaze-tracking means, wherein the at least one processor is configured to:
- utilise the gaze-tracking means to determine gaze directions of the eyes of the at least one user;
- detect, based on the gaze directions of the eyes of the at least one user, when the at least one user is not gazing through the at least one portion of the optical combiner from which the corresponding part of the synthetic light field is reflecting towards the given eye; and
- when it is detected that the at least one user is not gazing through the at least one portion of the optical combiner, skip activating the at least one portion of the at least one active optical device that corresponds to the at least one portion of the optical combiner.

When the at least one user is not gazing through the at least one portion of the optical combiner, it may be advantageous to skip activating the at least one portion of the at least one active optical device entirely, because each dimmed part of the real-world light field for the given eye of the given user potentially causes unintended dimming in other parts of the real-world light field for the other eye of the given user and/or for the eyes of the other user(s). This is because when presented to multiple users simultaneously, the same virtual content is presented through different portions of the optical combiner; therefore, local dimming for the given eye of the given user via the at least one portion of the at least one active optical device results in unintended dimming for the other eye of the given user and/or for the eyes of the other user(s). On the other hand, when it is detected that the at least one user is gazing through the at least one portion of the optical combiner, the at least one portion of the at least one active optical device is activated to decrease the transmittance and/or to increase the reflectance, as mentioned earlier.

Furthermore, optionally, the system further comprises the gaze-tracking means, wherein the at least one processor is configured to:
- utilise the gaze-tracking means to determine gaze directions of the eyes of the at least one user;
- determine an optical depth at which the at least one user is gazing;
- detect when a difference between the optical depth at which the at least one user is gazing and an optical depth at which the virtual content is being presented is greater than a predefined threshold difference; and
- when it is detected that said difference is greater than the predefined threshold difference, perform any one of:
  - skip activating the at least one portion of the at least one active optical device that corresponds to the at least one portion of the optical combiner, or
  - activate the at least one portion of the at least one optical device to increase the transmittance of the part of the real-world light field passing through the at least one portion of the optical combiner towards the given eye.

In this regard, the optical depth at which the at least one user is gazing can be determined based on an interpupillary distance of the at least one user and a convergence of the gaze directions of the eyes of the at least one user. Optionally, the at least one processor is configured to: utilise the tracking means to determine a location of the first eye and a location of the second eye in a local coordinate space; and determine the interpupillary distance, based on the determined location of the first eye and the determined location of the second eye.

The optical depth at which the virtual content is being presented is known, because it correlated with a disparity between the respective virtual images presented to the first eye and the second eye of the at least one user. When the difference between the optical depth at which the at least one user is gazing and the optical depth at which the virtual content is being presented is greater than the predefined threshold difference, it means that the user is looking at the real-world content, instead of the virtual content. In this regard, the predefine threshold difference can be expressed in terms of a predefined percent of any one of: the optical depth at which the at least one user is gazing, the optical depth at which the virtual content is being presented. As an example, the predefined percent could lie in a range of 10 percent to 20 percent. As another example, the predefined threshold difference could lie in a range of 50 centimetres to 100 centimetres; more optionally, in a range of 50 centimetres to 200 centimetres.

When such a situation is detected, it is beneficial to skip activating the at least one portion of the at least one active optical device that corresponds to the at least one portion of the optical combiner altogether, or activating the at least one portion of the at least one optical device to increase the transmittance of the part of the real-world light field passing through the at least one portion of the optical combiner towards the given eye. In particular, it may be advantageous to skip activating the at least one portion of the at least one active optical device entirely, because each dimmed part of the real-world light field for the given eye of the given user potentially causes unintended dimming in other parts of the real-world light field for the other eye of the given user and/or for the eyes of the other user(s). While increasing the transmittance of the part of the real-world light field (instead of decreasing the transmittance) ensures that the real-world content in the region of interest within the field of view of the user is visible to the user as clearly as possible. Otherwise, when it is detected that said difference is not greater than the predefined threshold difference, the at least one portion of the at least one active optical device is activated to decrease the transmittance and/or to increase the reflectance, as mentioned earlier.

Moreover, optionally, the at least one processor is configured to:
  determine at least one additional portion of the optical combiner through which real-world glare is passing towards the given eye; and
  activate at least one additional portion of the at least one active optical device that corresponds to the at least one additional portion of the optical combiner, to decrease transmittance of a part of the real-world light field passing through the at least one additional portion of the optical combiner towards the given eye.

A technical benefit of activating the at least one additional portion of the at least one active optical device to decrease the transmittance of the part of the real-world light field (that corresponds to the real-world glare) is that a comfortable viewing experience is facilitated to the at least one user. In most situations, the glare is coming from a significant distance. Thus, even without reprojection, an incoming direction of the glare is essentially the same for the at least one real-world-facing camera and the at least one user, even though they are at different positions. This is because a difference between a location of the given eye and a location of the at least one real-world-facing camera is insignificant when compared to a distance of a source of the glare (for example, such as the Sun, reflections from other vehicles, etc.) from the at least one real-world-facing camera.

Optionally, the at least one additional portion of the optical combiner through which the real-world glare is passing towards the given eye can be determined (more accurately) by:
  utilising the at least one real-world-facing camera to capture at least one 2D real-world image of the real-world environment,
  reprojecting the at least one 2D real-world image from the perspective of the at least one real-world-facing camera to the perspective of the viewpoint of the given eye,
  identifying at least one image segment in a reprojected version of the at least one 2D real-world image that represents the real-world glare, based on intensity values of pixels in the at least one image segment and optionally a shape of the at least one image segment, and
  mapping viewing directions of the pixels in the at least one image segment from the given eye with a viewing direction of the at least one additional portion of the optical combiner from the given eye.

In this regard, the at least one image segment can be identified as an image segment whose pixels' intensity values are higher than a predefined threshold intensity. The predefined threshold intensity may, for example, lie in a range of 200 to 255, for a 8-bit representation of the pixels. The at least one image segment may also be identified based on its shape, because real-world glare are known to often occur in certain shapes. This may depend on an environmental condition in which the system is being used currently. For example, in a bright outdoor environment, the real-world glare may be due to the Sun rays being reflected from a reflective surface. In such a case, the real-world glare may have a typical star-like shape.

Furthermore, optionally, the system further comprises an ambient light sensor arranged facing the real-world light field, wherein the at least one processor is configured to:
  determine an average intensity of the real-world light field by utilising the ambient light sensor;
  detect when the average intensity of the real-world light field is greater than a predefined threshold intensity; and
  when it is detected that the average intensity of the real-world light field is greater than the predefined threshold intensity, activate an entirety of the at least one active optical device to decrease the transmittance of the real-world light field passing through an entirety of the optical combiner.

In this regard, the average intensity of the real-world light field can be determined in lux values. The predefined threshold intensity may, for example, lie in a range of 10000 lux to 25000 lux. Examples of the ambient light sensor include, but are not limited to, a phototransistor, a photodiode, a photoresistor, and a photonic integrated circuit. In some implementations, the ambient light sensor may also be implemented as the at least one real-world-facing camera, wherein intensity values of pixels in images captured by the at least one real-world-facing camera can be combined to determine the average intensity of the real-world light field.

Advantageously, by activating the entirety of the at least one active optical device to decrease the transmittance of the real-world light field passing through the entirety of the optical combiner, it can be ensured that the user is able to see the virtual content clearly even in bright outdoor environments. Otherwise, when it is detected that the average intensity of the real-world light field is not greater than the predefined threshold intensity, the at least one portion of the at least one active optical device is selectively activated to decrease the transmittance and/or to increase the reflectance, as mentioned earlier.

Moreover, optionally, the at least one active optical device comprises a direction-dependent transmission reduction layer, wherein the transmittance of the part of the real-world light field passing through the at least one portion of the optical combiner towards the given eye is decreased, based on the relative location of the given eye with respect to the optical combiner. The direction-dependent transmission reduction layer is arranged on the real-world-facing side of the optical combiner. When the part of the real-world light field is incident on said layer, the transmittance of said part of the real-world light field is decreased only along the viewing direction of the given eye of the given user. This is highly advantageous, as a dimmed part of the real-world light field for the given eye of the given user does not cause any unintended dimming in other parts of the real-world light field for the other eye of the given user and/or for the eyes of the other user(s). Notably, without such a direction-dependent transmission reduction layer, each dimmed part of the real-world light field for the given eye of the given user potentially causes unintended dimming in other parts of the real-world light field for the other eye of the given user and/or for the eyes of the other user(s). This has been illustrated in conjunction with FIGS. 4B and 4C. The direction-dependent transmission reduction layer can be implemented in various ways. As an example, said layer could be implemented as a tuning liquid crystal matrix, wherein alignment of liquid crystal molecules in different portion of said matrix can be electrically controlled to partially block light incident from along the viewing direction of the given eye, while allowing passage of light toward the other eye of the given user and/or the eyes of the other user(s).

The present disclosure also relates to the method as described above. Various embodiments and variants disclosed above, with respect to the aforementioned first aspect, apply mutatis mutandis to the method.

Optionally, the method further comprises generating an input to be employed by the light field display unit for producing the synthetic light field, based on the relative location of the first eye and of the second eye of the at least one user with respect to the optical combiner. Optionally, in this regard, the method further comprises:
- capturing a two-dimensional (2D) real-world image of the real-world environment using at least one real-world-facing camera;
- determining, based on the relative location of the given eye with respect to the optical combiner, at least one other portion of the optical combiner from which no synthetic light field is being reflected towards the given eye, but whose corresponding portion of the at least one active optical device is activated to decrease transmittance of a part of the real-world light field passing through the at least one other portion of the optical combiner towards the given eye;
- determining a part of the input that is employed to produce a part of the synthetic light field that is being reflected by the at least one other portion of the optical combiner towards the given eye;
- generating a synthetic 2D image by utilising the 2D real-world image, the synthetic 2D image representing real-world content corresponding to at least the at least one other portion of the optical combiner from a perspective of the given eye; and
- determining a decrease in the transmittance of said part of the real-world light field passing through the at least one other portion of the optical combiner towards the given eye due to activation of the corresponding portion of the at least one active optical device, wherein the step of generating the input comprises utilising the synthetic 2D image depicting the real-world content, to generate intensity values for said part of the input, based on the decrease in the transmittance, and the relative location of the given eye with respect to the optical combiner.

Optionally, the method further comprises:
- utilising gaze-tracking means to determine gaze directions of the eyes of the at least one user;
- detecting, based on the gaze directions of the eyes of the at least one user, when the at least one user is not gazing through the at least one other portion of the optical combiner; and
- when it is detected that the at least one user is not gazing through the at least one other portion of the optical combiner, performing any one of:
  - skipping generating the synthetic 2D image depicting the real-world content corresponding to at least the at least one other portion of the optical combiner from the perspective of the given eye, or
  - generating the synthetic 2D image at a second resolution that is lower than a first resolution, wherein a given synthetic 2D image is generated at the first resolution when it is detected that the at least one user is gazing through the at least one other portion of the optical combiner.

Optionally, the method further comprises:
- determining an intensity of the part of the real-world light field passing through the at least one portion of the optical combiner from which the corresponding part of the synthetic light field is reflecting towards the given eye;
- detecting when the intensity of the part of the real-world light field passing through the at least one portion of the optical combiner is lower than an intended intensity of the corresponding part of the synthetic light field that is reflecting from the at least one portion of the optical combiner towards the given eye; and
- when it is detected that the intensity of said part of the real-world light field is lower than the intended intensity of the corresponding part of the synthetic light field,
  - skipping activating the at least one portion of the at least one active optical device that corresponds to the at least one portion of the optical combiner; and
  - adjusting intensity values of a given part of the input that is employed for producing the corresponding part of the synthetic light field, based on a difference between the intended intensity of the corresponding part of the synthetic light field and the intensity of said part of the real-world light field.

Optionally, the method further comprises:
utilising gaze-tracking means to determine gaze directions of the eyes of the at least one user;
detecting, based on the gaze directions of the eyes of the at least one user, when the at least one user is not gazing through the at least one portion of the optical combiner from which the corresponding part of the synthetic light field is reflecting towards the given eye; and
when it is detected that the at least one user is not gazing through the at least one portion of the optical combiner, skipping activating the at least one portion of the at least one active optical device that corresponds to the at least one portion of the optical combiner.

Optionally, the method further comprises:
utilising the gaze-tracking means to determine gaze directions of the eyes of the at least one user;
determining an optical depth at which the at least one user is gazing;
detecting when a difference between the optical depth at which the at least one user is gazing and an optical depth at which the virtual content is being presented is greater than a predefined threshold difference; and
when it is detected that said difference is greater than the predefined threshold difference, performing any one of:
  skipping activating the at least one portion of the at least one active optical device that corresponds to the at least one portion of the optical combiner, or
  activating the at least one portion of the at least one optical device to increase the transmittance of the part of the real-world light field passing through the at least one portion of the optical combiner towards the given eye.

Optionally, the method further comprises:
determining at least one additional portion of the optical combiner through which real-world glare is passing towards the given eye; and
activating at least one additional portion of the at least one active optical device that corresponds to the at least one additional portion of the optical combiner, to decrease transmittance of a part of the real-world light field passing through the at least one additional portion of the optical combiner towards the given eye.

Optionally, the method further comprises:
  determining an average intensity of the real-world light field by utilising an ambient light sensor that is arranged facing the real-world light field;
  detecting when the average intensity of the real-world light field is greater than a predefined threshold intensity; and
  when it is detected that the average intensity of the real-world light field is greater than the predefined threshold intensity, activating an entirety of the at least one active optical device to decrease the transmittance of the real-world light field passing through an entirety of the optical combiner.

Optionally, in the method, the at least one active optical device comprises a direction-dependent transmission reduction layer, wherein the transmittance of the part of the real-world light field passing through the at least one portion of the optical combiner towards the given eye is decreased, based on the relative location of the given eye with respect to the optical combiner.

DETAILED DESCRIPTION OF THE DRAWINGS

Referring to FIG. 1, illustrated is an example implementation of a system 100 incorporating local dimming and compensation during synthetic light field display, in accordance with an embodiment of the present disclosure. The system 100 is shown to be employed in a real-world environment 102. The system 100 comprises tracking means 104, a light field display unit 106, an optical combiner 108, at least one active optical device (depicted as an active optical device 110) and at least one processor (depicted as a processor 112). The tracking means 104 is shown to be implemented, for example, as at least one tracking camera. The optical combiner 108 is arranged on an optical path of the light field display unit 106 and on an optical path of a real-world light field 114 of the real-world environment 102. The active optical device 110 is arranged on the optical path of the real-world light field 114. The at least one active optical device is employed to selectively control at least one of: (i) transmittance of at least a part of the real-world light field 114 passing through at least a portion of the optical combiner 108, (ii) reflectance of at least a part of a synthetic light field 116 produced by the light field display unit 106 and reflected from at least a portion of the optical combiner 108. In the real-world environment 102, there are one or more real-world objects, depicted as a real-world object 118 (shown as a tree). Optionally, the system 100 further comprises at least one real-world-facing camera (depicted as a real-world-facing camera 120).

When the system 100 is in use, the tracking means 104 is utilised by the processor 112 to determine a relative location of a first eye 122a and of a second eye 122b of a user 124 with respect to the optical combiner 108. The synthetic light field 116 presenting virtual content pertaining to at least one virtual object (depicted as a virtual object 126, shown as a star) is produced using the light field display unit 106. For illustration purposes only, the virtual object 126 is shown to be presented at an optical depth that is (almost) same as an optical depth of the real-world object 118. The optical combiner 108 is employed to reflect a first part and a second part of the synthetic light field 116 towards the first eye 122a and the second eye 122b of the user 124, respectively, whilst optically combining the first part and the second part of the synthetic light field 116 with the real-world light field 114.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking means, light field display units, optical combiners, active optical devices, processors, and real-world-facing cameras. The person skilled in the art will recognize many variations, alternatives, and modifications of embodiments of the present disclosure. For example, in FIG. 1, the active optical device 110 has been shown to be arranged on a real-world-facing side of the optical combiner 108. It will be appreciated that the active optical device 110 could alternatively be arranged on a user-facing side of the optical combiner 108, or the at least one active optical device could include an additional active optical device (in addition to the active optical device 110 arranged on the real-world-facing side) that is arranged on the user-facing side of the optical combiner 108.

Figure 2A:
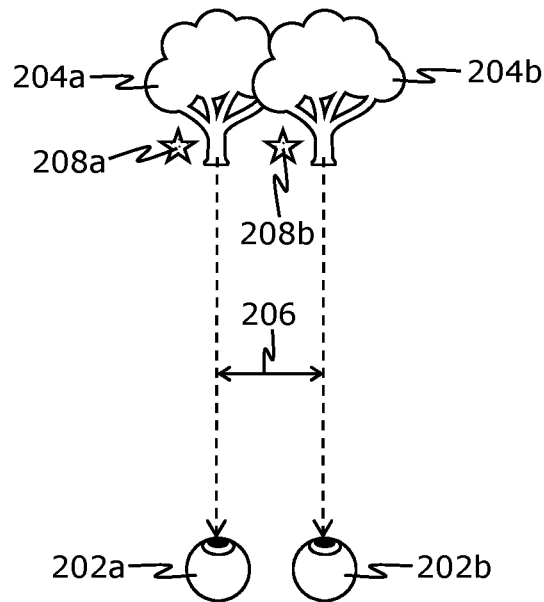
FIG. 2A illustrates an exemplary scenario of how a first eye and a second eye of a user view a virtual object and a real-world object, in accordance with an embodiment of the present disclosure.

Referring to FIG. 2A, illustrated is an exemplary scenario of how a first eye 202a and a second eye 202b of a user view a real-world object and a virtual object, in accordance with an embodiment of the present disclosure. With reference to FIG. 2A, the user views the real-world object (for example, depicted as a tree) that lies at a near-infinite distance from the first eye 202a and the second eye 202b. From a perspective of the first eye 202a, the tree is seen as a real-world image 204a, whereas from a perspective of the second eye 202b, the same tree is seen as a real-world image 204b. Thus, the same real-world object (that is, the tree) is seen by the first eye 202a and the second eye 202b from slightly different perspectives, such that a distance between the real-world image 204a and the real-world image 204b is approximately equal to an interpupillary distance (IPD) 206 between the first eye 202a and the second eye 202b. Thus, when a virtual image 208a of a virtual object (for example, depicted as a star) is displayed to the first eye 202a, and a virtual image 208b of the same virtual object is displayed to the second eye 202a at the near-infinite distance, a distance between the virtual image 208a and the virtual image 208b is employed to be approximately equal to the IPD 206.

Figure 2B:
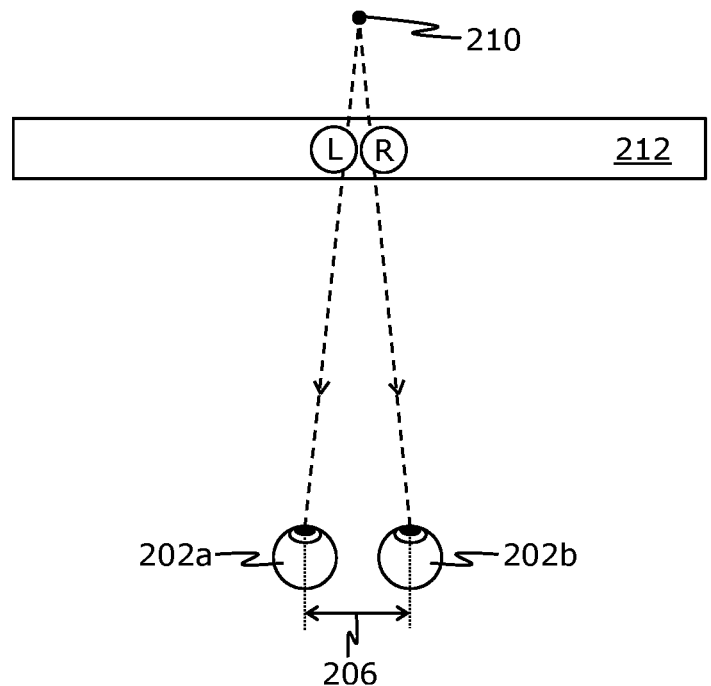
FIGS. 2B and 2C illustrate two different exemplary scenarios of how a disparity between a given pixel of a first set and a given pixel of a second set within a light field image varies with respect to an optical depth at which a given synthetic 3D point is to be displayed, in accordance with an embodiment of the present disclosure.
Figure 2C:
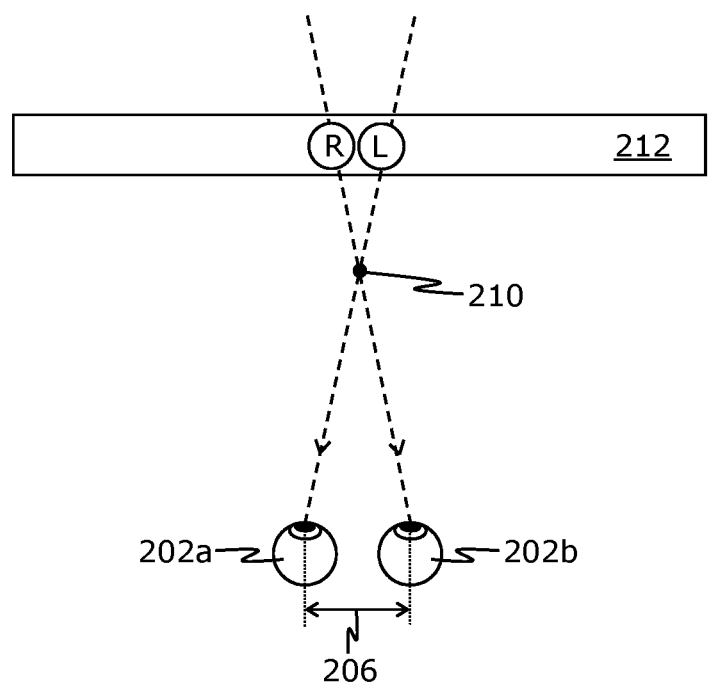

In a case where a light field image is implemented as an input that is employed by a light field display unit 212 for producing the virtual images 208a-b, a distance between a given pixel L in a first set of pixels and a given pixel R in a second set of pixels (that correspond to a given synthetic 3D point 210 on the virtual object) within the light field image is approximately equal to the IPD 206. Referring to FIGS. 2B and 2C, illustrated are two different exemplary scenarios of how a disparity between the given pixel L of the first set and the given pixel R of the second set varies with respect to an optical depth at which the given synthetic 3D point 210 is to be displayed, in accordance with an embodiment of the present disclosure. With reference to FIG. 2B, for a first scenario, when the optical depth at which the given synthetic 3D point 210 is to be displayed is greater than a native optical depth of a light-emitting component of a light field display unit 212, the disparity between the given pixel L of the first set and the given pixel R of the second set is positive. As shown, when the disparity is positive, a position of the given pixel L of the first set is towards a side of the first eye 202a, and a position of the given pixel R of the second set is towards a side of the second eye 202b. When the disparity is positive, said disparity may increase asymptotically to reach its maximum value, which is equal to an interpupillary distance 206 between the first eye 202a and the second eye 202b. With reference to FIG. 2C, when the optical depth at which the given synthetic 3D point 210 is to be displayed is smaller than the native optical depth, the disparity between the given pixel L of the first set and the given pixel R of the second set is negative. As shown, when the disparity is negative, the position of the given pixel L of the first set is towards the side of the second eye 202b, and the position of the given pixel R of the second set is towards the side of the first eye 202a, i.e., an order of the position of the given pixel L of the first set and the position of the given pixel R of the second set is swapped, as compared to when the disparity is positive.

Figure 3A:
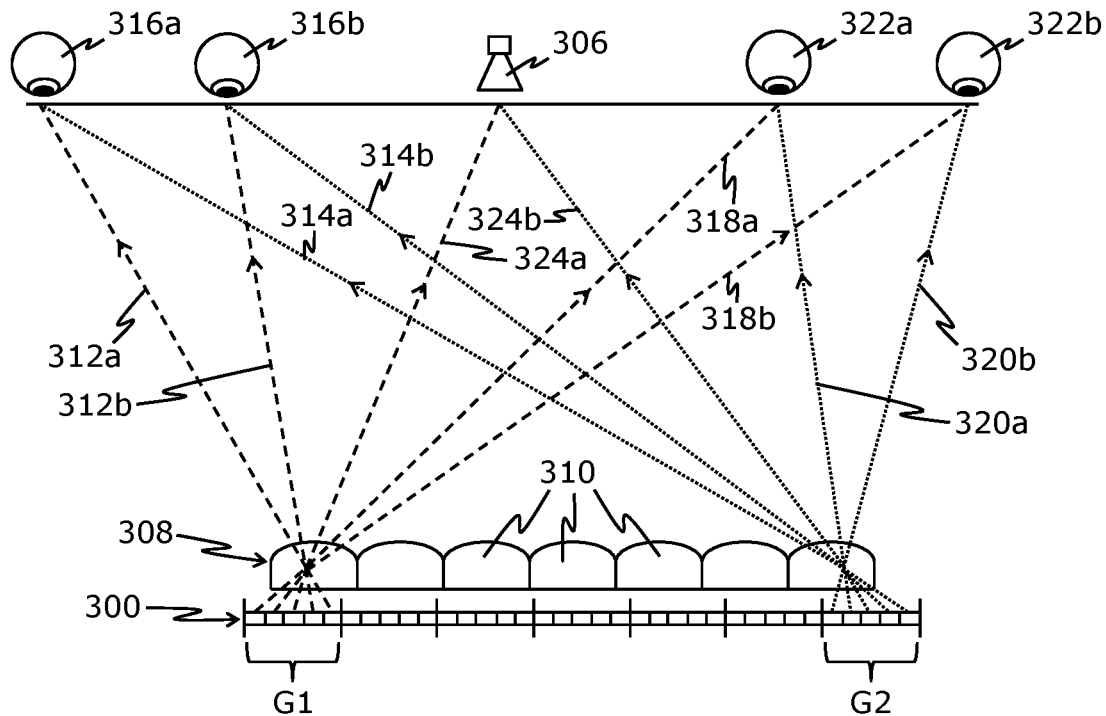
Figure 3B:
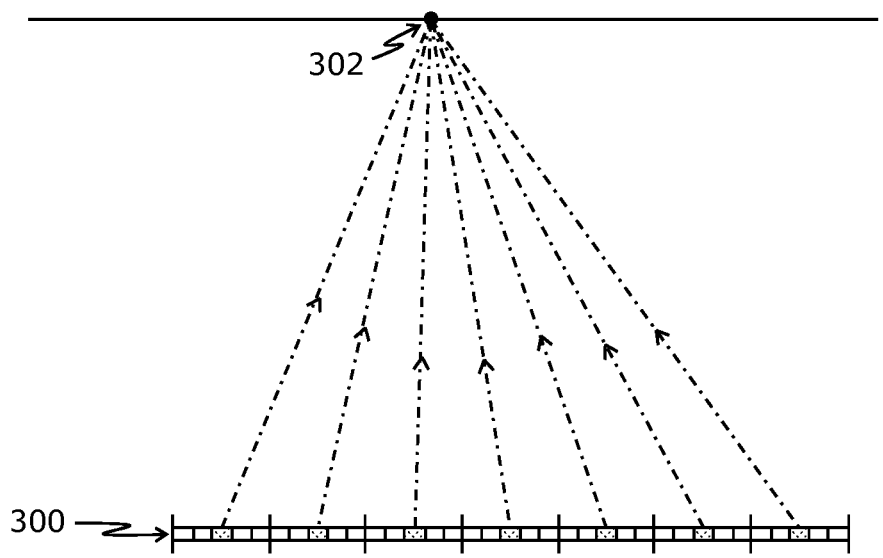
FIG. 3B illustrates example positions of pixels within the light-emitting component from a perspective of a viewer, in accordance with an embodiment of the present disclosure.

Referring to FIGS. 3A and 3B, FIG. 3A illustrates an example scenario of how a light emitting-component of a light field display unit 300 produces a synthetic light field for different viewers, while FIG. 3B illustrates exemplary positions of pixels within the light-emitting component of the light field display unit 300 from a perspective of a viewer 302 present in a real-world environment, in accordance with an embodiment of the present disclosure. With reference to FIGS. 3A and 3B, for sake of simplicity and clarity, only a portion of the light-emitting component of the light field display unit 300 is shown in one dimension. With reference to FIG. 3A, the light-emitting component of the light field display unit 300 produces the synthetic light field for a first user, a second user, and a camera 306. With reference to FIG. 3A, the light field display unit 300 has been implemented as a lenticular-array-based light field display unit comprising a lenticular array 308, for illustration purposes only. The light field display unit 300 can be implemented by other types of light field display units also. For sake of simplicity and clarity, the lenticular array is shown to comprise seven cylindrical microlenses 310 arranged in a side-by-side manner, wherein a given microlens of the lenticular array has been shown to correspond to, for example, a group of five pixels in the light-emitting component of the light field display unit 300. For sake of better understanding, light emanating from pixels of only two groups G1 and G2 (in the light-emitting component of the light field display unit 300) is shown to be controlled using the lenticular array 308. In an actual implementation, light emanating from all pixels in the light-emitting component of the light field display unit 300 would be controlled using the lenticular array 308 accordingly, in a similar manner. The light emanating from the pixels of the group G1 is depicted using dashed lines, and the light emanating from the pixels of the group G2 is depicted using dotted lines.

Light 312a emanating from a first pixel of the group G1 and light 314a emanating from a first pixel of the group G2 generate a first part of the synthetic light field corresponding to a location of a first eye 316a of the first user. Simultaneously, light 312b emanating from a second pixel of the group G1 and light 314b emanating from a second pixel of the group G2 generate a second part of the synthetic light field corresponding to a location of a second eye 316b of the first user. Further, light 318a emanating from a third pixel of the group G1 and light 320a emanating from a third pixel of the group G2 generate a first part of the synthetic light field corresponding to a location of a first eye 322a of the second user. Simultaneously, light 318b emanating from a fourth pixel of the group G1 and light 320b emanating from a fourth pixel of the group G2 generate a second part of the synthetic light field corresponding to a location of a second eye 322b of the second user. It will be appreciated that upon generation of the first part and the second part of the synthetic light field, said first part and said second part are reflected off an optical combiner (not shown, for sake of simplicity and clarity) to be incident towards respective first eyes and respective second eyes.

Moreover, light 324a emanating from a fifth pixel of the group G1 and light 324b emanating from a fifth pixel of the group G2 generate a third part of the synthetic light field corresponding to a location of a camera lens of the camera 306. It will be appreciated that upon generation of the third part of the synthetic light field, said third part is reflected off the optical combiner to be incident towards the camera 306.

With reference to FIG. 3B, the viewer 302 could, for example, be a given eye of a user or a camera lens of a camera. As shown, out of each group of pixels in the light-emitting component of the light field display unit 300, visual information corresponding to only a few pixels (for example, shown as a single pixel depicted using a dotted pattern) in each group is directed towards the viewer 302, when the light-emitting component of the light field display unit 300 produces the synthetic light field. Thus, light emanating from only those pixels in the light-emitting component of the light field display unit 300 are directed towards the location of the viewer 302, to generate a corresponding part of the synthetic light field corresponding to the location of the viewer 302.

Figure 4A:
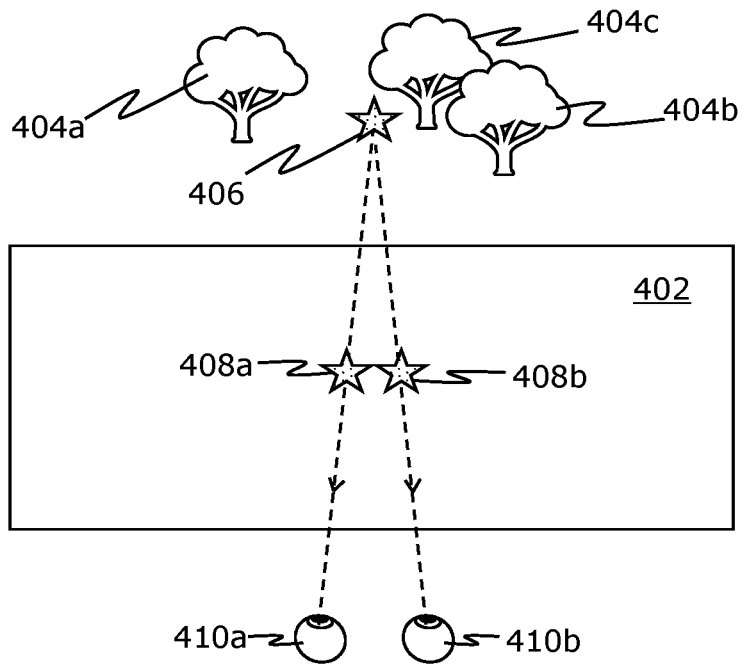
FIGS. 4A and 4B illustrate how a dimmed part of a real-world light field for a given eye of a given user potentially causes unintended dimming in other parts of the real-world light field for another eye of the given user and similarly for eyes of other user(s), in accordance with an embodiment of the present disclosure.
Figure 4B:
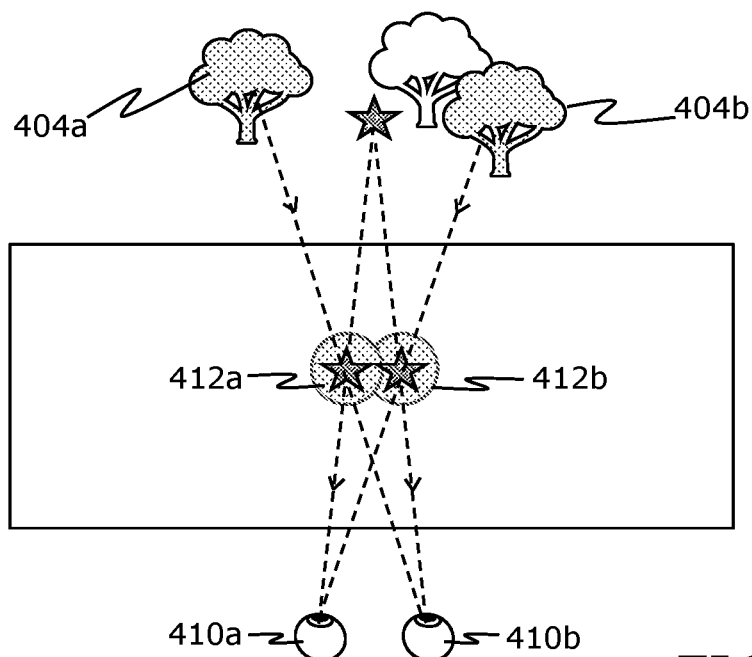

FIGS. 4A and 4B illustrate how a dimmed part of a real-world light field for a given eye of a given user potentially causes unintended dimming in other parts of the real-world light field for another eye of the given user and similarly for eyes of other user(s), in accordance with an embodiment of the present disclosure. An optical combiner 402 is employed to optically combine the real-world light field with a synthetic light field. The real-world light field is representative of real-world objects 404a-b (shown as three trees) present in a real-world environment. The synthetic light field presents virtual content pertaining to at least one virtual object, depicted as a virtual object 406 (shown as a star). Virtual images 408a and 408b of the virtual object 406 are presented to a first eye 410a and a second eye 410b of a given user, respectively. As shown, the same virtual object 406 is presented through different portions 412a and 412b of the optical combiner 402. For sake of clarity and illustration purposes only, a shape of these different portions 412a-b has been shown as a circle; it will be appreciated that in actual usage, these portions 412a-b would have shapes that are similar to a shape of the virtual object 406.

When a portion of at least one active optical device corresponding to the portion 412a of the optical combiner 402 is activated, for example, to decrease a transmittance of a part of the real-world light field (passing through the portion 412a of the optical combiner 402), the first eye 410a is able to see the virtual image 408a clearly and with high contrast. However, this results in unintended dimming of another part of the real-world light field that pertains to the real-world object 404a for the second eye 410b. Similarly, when a portion of at least one active optical device corresponding to the portion 412b of the optical combiner 402 is activated, for example, to decrease a transmittance of a part of the real-world light field (passing through the portion 412b of the optical combiner 402), the second eye 410b is able to see the virtual image 408b clearly and with high contrast. However, this results in unintended dimming of yet another part of the real-world light field that pertains to the real-world object 404b for the first eye 410a. This technical problem is highly undesirable, and is only exacerbated when the same virtual object 406 is to be presented to multiple users simultaneously. As mentioned earlier, this problem can be mitigated in several ways, for example, upon detecting when the given user is not gazing through at least one portion of the optical combiner 402 from which a corresponding part of the synthetic light field is reflecting towards a given eye of the given user, and/or upon detecting when a difference between an optical depth at which the given user is gazing and an optical depth at which the virtual object 406 is being presented is greater than a predefined threshold difference.

Figure 4C:
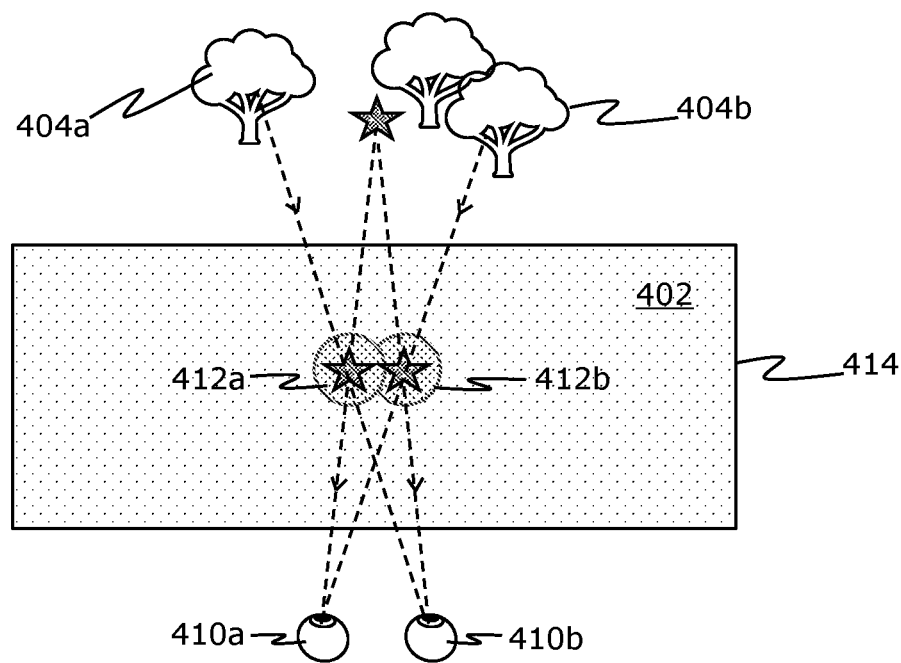
FIG. 4C illustrates how direction-dependent transmission reduction can prevent unintended dimming, in accordance with a specific embodiment of the present disclosure.

FIG. 4C illustrates how direction-dependent transmission reduction can prevent unintended dimming, in accordance with a specific embodiment of the present disclosure. The at least one active optical device comprises a direction-dependent transmission reduction layer 414, as shown. The transmittance of the part of the real-world light field (passing through the portion 412*a* of the optical combiner 402) towards the first eye 410*a* is decreased for a viewing direction of the first eye 410*a* only, and the transmittance of the part of the real-world light field (passing through the portion 412*b* of the optical combiner 402) towards the second eye 410*b* is decreased for a viewing direction of the second eye 410*b* only. As a result, the first eye 410*a* and the second eye 410*b* are able to see the real-world object 404*b* and the real-world object 404*a*, respectively, without any unintended dimming.

FIGS. 2A-C, 3A-B, 4A-C are merely examples, which should not unduly limit the scope of the claims herein. A person skilled in the art will recognize many variations, alternatives, and modifications of embodiments of the present disclosure.

Figure 5:
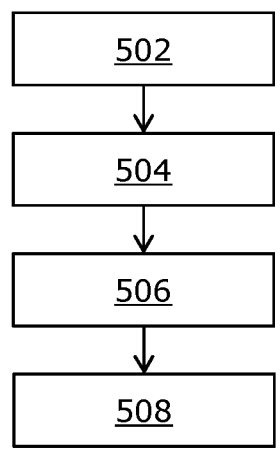
FIG. 5 illustrates steps of a method incorporating local dimming and compensation during synthetic light field display, in accordance with an embodiment of the present disclosure.

Referring to FIG. 5, illustrated are steps of a method incorporating local dimming and compensation during synthetic light field display, in accordance with an embodiment of the present disclosure. At step 502, tracking means is utilised to determine a relative location of a first eye and of a second eye of at least one user with respect to an optical combiner, wherein the optical combiner is arranged on an optical path of a light field display unit and on an optical path of a real-world light field of a real-world environment. At step 504, a synthetic light field presenting virtual content is produced using the light field display unit, wherein the optical combiner is employed to reflect a first part and a second part of the synthetic light field towards the first eye and the second eye of the at least one user, respectively, whilst optically combining the first part and the second part of the synthetic light field with the real-world light field. At step 506, at least one portion of the optical combiner from which a part of the synthetic light field is reflecting towards a given eye of the at least one user is determined, based on the relative location of the given eye with respect to the optical combiner. At step 508, at least one portion of at least one active optical device, arranged on the optical path of the real-world light field, that corresponds to the at least one portion of the optical combiner is activated, to perform at least one of:

(i) decreasing a transmittance of a part of the real-world light field passing through the at least one portion of the optical combiner towards the given eye, (ii) increasing a reflectance of the part of the synthetic light field being reflected by the at least one portion of the optical combiner towards the given eye.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

tracking means;

a light field display unit;

an optical combiner arranged on an optical path of the light field display unit and on an optical path of a real-world light field of a real-world environment;

at least one active optical device, arranged on the optical path of the real-world light field, employed to selectively control at least one of: (i) transmittance of at least a part of the real-world light field passing through at least a portion of the optical combiner, and (ii) reflectance of at least a part of a synthetic light field produced by the light field display unit and reflected from at least a portion of the optical combiner; and at least one processor configured to:

utilise the tracking means to determine a relative location of a first eye and of a second eye of an individual one of at least one user with respect to the optical combiner;

produce the synthetic light field presenting virtual content using the light field display unit, wherein the optical combiner is employed to reflect a first part and a second part of the synthetic light field towards the first eye and the second eye of the individual one of at least one user, respectively, whilst optically combining the first part and the second part of the synthetic light field with the real-world light field;

determine at least one portion of the optical combiner from which a part of the synthetic light field is reflecting towards a specified eye of the individual one of at least one user, based on a relative location of the specified eye with respect to the optical combiner; and activate at least one portion of the at least one active optical device that corresponds to the at least one portion of the optical combiner, to perform at least one of:

(i) decrease the transmittance of a part of the real-world light field passing through the at least one portion of the optical combiner towards the specified eye, and (ii) increase the reflectance of the part of the synthetic light field being reflected by the at least one portion of the optical combiner towards the specified eye.

2. The system of claim 1, wherein the at least one processor is configured to generate an input to be employed by the light field display unit for producing the synthetic light field, based on the relative location of the first eye and of the second eye of the individual one of at least one user with respect to the optical combiner.

3. The system of claim 2, further comprising at least one real-world-facing camera that is employed to capture a two-dimensional (2D) real-world image of the real-world environment, wherein the at least one processor is configured to:

determine, based on the relative location of the specified eye with respect to the optical combiner, at least one other portion of the optical combiner from which no synthetic light field is being reflected towards the specified eye, but whose corresponding portion of the at least one active optical device is activated to decrease transmittance of a part of the real-world light field passing through the at least one other portion of the optical combiner towards the specified eye;

determine a part of the input that is employed to produce a part of the synthetic light field that is being reflected by the at least one other portion of the optical combiner towards the specified eye;

generate a synthetic 2D image by utilising the 2D real-world image, the synthetic 2D image representing real-world content corresponding to at least the at least one other portion of the optical combiner from a perspective of the specified eye; and determine a decrease in the transmittance of said part of the real-world light field passing through the at least one other portion of the optical combiner towards the specified eye due to activation of the corresponding portion of the at least one active optical device, wherein when generating the input to be employed by the light field display unit for producing the synthetic light field, the at least one processor is configured to utilise the synthetic 2D image depicting the real-world content, to generate intensity values for said part of the input, based on the decrease in the transmittance, and the relative location of the specified eye with respect to the optical combiner.

4. The system of claim 3, further comprising gaze-tracking means, wherein the at least one processor is configured to:
utilise the gaze-tracking means to determine gaze directions of the eyes of the individual one of at least one user;
detect, based on the gaze directions of the eyes of the individual one of at least one user, when the individual one of at least one user is not gazing through the at least one other portion of the optical combiner; and
when it is detected that the individual one of at least one user is not gazing through the at least one other portion of the optical combiner, perform any one of:
skip generating the synthetic 2D image depicting the real-world content corresponding to at least the at least one other portion of the optical combiner from the perspective of the specified eye, or
generate the synthetic 2D image at a second resolution that is lower than a first resolution, wherein a given synthetic 2D image is generated at the first resolution when it is detected that the individual one of at least one user is gazing through the at least one other portion of the optical combiner.

5. The system of claim 1, wherein the at least one processor is configured to:
determine an intensity of the part of the real-world light field passing through the at least one portion of the optical combiner from which the corresponding part of the synthetic light field is reflecting towards the specified eye;
detect when the intensity of the part of the real-world light field passing through the at least one portion of the optical combiner is lower than an intended intensity of the corresponding part of the synthetic light field that is reflecting from the at least one portion of the optical combiner towards the specified eye; and
when it is detected that the intensity of said part of the real-world light field is lower than the intended intensity of the corresponding part of the synthetic light field,
skip activating the at least one portion of the at least one active optical device that corresponds to the at least one portion of the optical combiner; and
adjust intensity values of a given part of the input that is employed for producing the corresponding part of the synthetic light field, based on a difference between the intended intensity of the corresponding part of the synthetic light field and the intensity of said part of the real-world light field.

6. The system of claim 1, further comprising gaze-tracking means, wherein the at least one processor is configured to:
utilise the gaze-tracking means to determine gaze directions of the eyes of the individual one of at least one user;
detect, based on the gaze directions of the eyes of the individual one of at least one user, when the individual one of at least one user is not gazing through the at least one portion of the optical combiner from which the corresponding part of the synthetic light field is reflecting towards the specified eye; and
when it is detected that the individual one of at least one user is not gazing through the at least one portion of the optical combiner, skip activating the at least one portion of the at least one active optical device that corresponds to the at least one portion of the optical combiner.

7. The system of claim 1, further comprising gaze-tracking means, wherein the at least one processor is configured to:
utilise the gaze-tracking means to determine gaze directions of the eyes of the individual one of at least one user;
determine an optical depth at which the individual one of at least one user is gazing;
detect when a difference between the optical depth at which the individual one of at least one user is gazing and an optical depth at which the virtual content is being presented is greater than a predefined threshold difference; and
when it is detected that said difference is greater than the predefined threshold difference, perform any one of:
skip activating the at least one portion of the at least one active optical device that corresponds to the at least one portion of the optical combiner, or
activate the at least one portion of the at least one optical device to increase the transmittance of the part of the real-world light field passing through the at least one portion of the optical combiner towards the specified eye.

8. The system of claim 1, wherein the at least one processor is configured to:
determine at least one additional portion of the optical combiner through which real-world glare is passing towards the specified eye; and
activate at least one additional portion of the at least one active optical device that corresponds to the at least one additional portion of the optical combiner, to decrease transmittance of a part of the real-world light field passing through the at least one additional portion of the optical combiner towards the specified eye.

9. The system of claim 1, further comprising an ambient light sensor arranged facing the real-world light field, wherein the at least one processor is configured to:
determine an average intensity of the real-world light field by utilising the ambient light sensor;
detect when the average intensity of the real-world light field is greater than a predefined threshold intensity; and
when it is detected that the average intensity of the real-world light field is greater than the predefined threshold intensity, activate an entirety of the at least one active optical device to decrease the transmittance of the real-world light field passing through an entirety of the optical combiner.

10. The system of claim 1, wherein the at least one active optical device comprises a direction-dependent transmission reduction layer, wherein the transmittance of the part of the real-world light field passing through the at least one portion of the optical combiner towards the specified eye is decreased, based on the relative location of the specified eye with respect to the optical combiner.

11. A method comprising:
utilising tracking means to determine a relative location of a first eye and of a second eye of an individual one of at least one user with respect to an optical combiner, the optical combiner being arranged on an optical path of a light field display unit and on an optical path of a real-world light field of a real-world environment;
producing a synthetic light field presenting virtual content using the light field display unit, wherein the optical combiner is employed to reflect a first part and a second part of the synthetic light field towards the first eye and the second eye of the individual one of at least one user, respectively, whilst optically combining the first part and the second part of the synthetic light field with the real-world light field;
determining at least one portion of the optical combiner from which a part of the synthetic light field is reflecting towards a specified eye of the individual one of at least one user, based on the relative location of the specified eye with respect to the optical combiner; and
activating at least one portion of at least one active optical device, arranged on the optical path of the real-world light field, that corresponds to the at least one portion of the optical combiner, to perform at least one of:
(i) decreasing a transmittance of a part of the real-world light field passing through the at least one portion of the optical combiner towards the specified eye, and
(ii) increasing a reflectance of the part of the synthetic light field being reflected by the at least one portion of the optical combiner towards the specified eye.

12. The method of claim 11, further comprising generating an input to be employed by the light field display unit for producing the synthetic light field, based on the relative location of the first eye and of the second eye of the individual one of at least one user with respect to the optical combiner.

13. The method of claim 12, further comprising:
capturing a two-dimensional (2D) real-world image of the real-world environment using at least one real-world-facing camera;
determining, based on the relative location of the specified eye with respect to the optical combiner, at least one other portion of the optical combiner from which no synthetic light field is being reflected towards the specified eye, but whose corresponding portion of the at least one active optical device is activated to decrease transmittance of a part of the real-world light field passing through the at least one other portion of the optical combiner towards the specified eye;
determining a part of the input that is employed to produce a part of the synthetic light field that is being reflected by the at least one other portion of the optical combiner towards the specified eye;
generating a synthetic 2D image by utilising the 2D real-world image, the synthetic 2D image representing real-world content corresponding to at least the at least one other portion of the optical combiner from a perspective of the specified eye; and
determining a decrease in the transmittance of said part of the real-world light field passing through the at least one other portion of the optical combiner towards the specified eye due to activation of the corresponding portion of the at least one active optical device,
wherein the step of generating the input comprises utilising the synthetic 2D image depicting the real-world content, to generate intensity values for said part of the input, based on the decrease in the transmittance, and the relative location of the specified eye with respect to the optical combiner.

14. The method of claim 13, further comprising:
utilising gaze-tracking means to determine gaze directions of the eyes of the individual one of at least one user;
detecting, based on the gaze directions of the eyes of the individual one of at least one user, when the individual one of at least one user is not gazing through the at least one other portion of the optical combiner; and
when it is detected that the individual one of at least one user is not gazing through the at least one other portion of the optical combiner, performing any one of:
skipping generating the synthetic 2D image depicting the real-world content corresponding to at least the at least one other portion of the optical combiner from the perspective of the specified eye, or
generating the synthetic 2D image at a second resolution that is lower than a first resolution, wherein a given synthetic 2D image is generated at the first resolution when it is detected that the individual one of at least one user is gazing through the at least one other portion of the optical combiner.

15. The method of claim 11, further comprising:
determining an intensity of the part of the real-world light field passing through the at least one portion of the optical combiner from which the corresponding part of the synthetic light field is reflecting towards the specified eye;
detecting when the intensity of the part of the real-world light field passing through the at least one portion of the optical combiner is lower than an intended intensity of the corresponding part of the synthetic light field that is reflecting from the at least one portion of the optical combiner towards the specified eye; and
when it is detected that the intensity of said part of the real-world light field is lower than the intended intensity of the corresponding part of the synthetic light field,
skipping activating the at least one portion of the at least one active optical device that corresponds to the at least one portion of the optical combiner; and
adjusting intensity values of a given part of the input that is employed for producing the corresponding part of the synthetic light field, based on a difference between the intended intensity of the corresponding part of the synthetic light field and the intensity of said part of the real-world light field.

16. The method of claim 11, further comprising:
utilising gaze-tracking means to determine gaze directions of the eyes of the individual one of at least one user;
detecting, based on the gaze directions of the eyes of the individual one of at least one user, when the individual one of at least one user is not gazing through the at least one portion of the optical combiner from which the corresponding part of the synthetic light field is reflecting towards the specified eye; and
when it is detected that the individual one of at least one user is not gazing through the at least one portion of the optical combiner, skipping activating the at least one portion of the at least one active optical device that corresponds to the at least one portion of the optical combiner.

17. The method of claim 11, further comprising:

utilising the gaze-tracking means to determine gaze directions of the eyes of the individual one of at least one user;

determining an optical depth at which the individual one of at least one user is gazing;

detecting when a difference between the optical depth at which the individual one of at least one user is gazing and an optical depth at which the virtual content is being presented is greater than a predefined threshold difference; and when it is detected that said difference is greater than the predefined threshold difference, performing any one of:
  skipping activating the at least one portion of the at least one active optical device that corresponds to the at least one portion of the optical combiner, or
  activating the at least one portion of the at least one optical device to increase the transmittance of the part of the real-world light field passing through the at least one portion of the optical combiner towards the specified eye.

18. The method of claim 11, further comprising:

determining at least one additional portion of the optical combiner through which real-world glare is passing towards the specified eye; and activating at least one additional portion of the at least one active optical device that corresponds to the at least one additional portion of the optical combiner, to decrease transmittance of a part of the real-world light field passing through the at least one additional portion of the optical combiner towards the specified eye.

19. The method of claim 11, further comprising:

determining an average intensity of the real-world light field by utilising an ambient light sensor that is arranged facing the real-world light field;

detecting when the average intensity of the real-world light field is greater than a predefined threshold intensity; and when it is detected that the average intensity of the real-world light field is greater than the predefined threshold intensity, activating an entirety of the at least one active optical device to decrease the transmittance of the real-world light field passing through an entirety of the optical combiner.

20. The method of claim 11, wherein the at least one active optical device comprises a direction-dependent transmission reduction layer, wherein the transmittance of the part of the real-world light field passing through the at least one portion of the optical combiner towards the specified eye is decreased, based on the relative location of the specified eye with respect to the optical combiner.

* * * * *